(12) United States Patent
Moulin

(10) Patent No.: US 7,731,870 B2
(45) Date of Patent: Jun. 8, 2010

(54) PUREX METHOD AND ITS USES

(75) Inventor: Jean-Paul Moulin, Bois d'Arcy (FR)

(73) Assignee: Compagnie General des Matieres Nucleaires, Velizy Villacoublay (FR)

( * ) Notice: Subject to any disclaimer, the term of this patent is extended or adjusted under 35 U.S.C. 154(b) by 187 days.

(21) Appl. No.: 11/793,891

(22) PCT Filed: Dec. 27, 2005

(86) PCT No.: PCT/FR2005/051146

§ 371 (c)(1),
(2), (4) Date: Jun. 21, 2007

(87) PCT Pub. No.: WO2006/072729

PCT Pub. Date: Jul. 13, 2006

(65) Prior Publication Data

US 2008/0089819 A1 Apr. 17, 2008

(30) Foreign Application Priority Data

Dec. 29, 2004 (FR) .................... 04 14034

(51) Int. Cl.
*C09K 11/04* (2006.01)
(52) U.S. Cl. .......................... 252/643; 423/8
(58) Field of Classification Search ............. 252/643; 423/8
See application file for complete search history.

(56) References Cited

U.S. PATENT DOCUMENTS 4,131,527 A 12/1978 Friedman et al. ...... 204/157.1 R
4,787,979 A 11/1988 Kolarik et al. ............. 210/634

(Continued)

FOREIGN PATENT DOCUMENTS

JP     2004012166 A  *  1/2004

(Continued)

OTHER PUBLICATIONS

French Seach Report, FA 658629; FR 0414034, 2 pgs., (Mar. 11, 2005).

(Continued)

*Primary Examiner*—Melvin C Mayes
*Assistant Examiner*—Melissa Stalder
(74) *Attorney, Agent, or Firm*—Nixon Peabody LLP

(57) ABSTRACT

The invention relates to a method constituting an improvement of the PUREX method, which makes it possible to obtain separation of uranium from the other actinides (Pu, Np, Th, . . . ) in a single purification cycle.

This method successively comprises: a) co-extracting the uranium(VI), plutonium(IV) and other actinides(IV) or (VI) from an aqueous nitric solution by using solvent phase and scrubbing the latter; b) back-extracting the plutonium in oxidation state (III) from the solvent phase by using an aqueous nitric solution; c) back-extracting the uranium in oxidation state (VI) from the solvent phase by using an aqueous nitric solution; d) concentrating the aqueous nitric solution resulting from step c) with respect to uranium(VI); and it is characterized in that some of the uranium(VI)-concentrated aqueous solution obtained in step d) is used for back-extracting the actinide(IV) or actinides(IV) from the solvent phase during step b) or between steps b) and c).

Uses: reprocessing of spent nuclear fuels based on $UO_2$, $(U,Pu)O_2$ or $(U,Th)O_2$ mixed oxide.

24 Claims, 4 Drawing Sheets

U.S. PATENT DOCUMENTS 5,476,641 A * 12/1995 Todokoro et al. ............... 423/6
7,157,003 B2 * 1/2007 Baron et al. ................ 210/639

FOREIGN PATENT DOCUMENTS

WO      99/23668      5/1999

WO      99/62824      12/1999

OTHER PUBLICATIONS

Germain, M. et al., "Extraction En Milieu Nitrique Du Thorium, Due Neptunium, Du Plutonium, Par Les Solutions De Phosphate De Tributyle Chargee En Uranium", Article of Germain et al., J. Inorg. Chem., vol. 32, pp. 245-253, (1970).

* cited by examiner

PUREX METHOD AND ITS USES

CROSS REFERENCE TO RELATED APPLICATIONS OR PRIORITY CLAIM

This application is a national phase of International Application No. PCT/FR2005/051146 entitled "Improvement Of The Purex Method And Uses Thereof", which was filed on Dec. 27, 2005, which was not published in English, and which claims priority of the French Patent Application No. 04 14034 filed Dec. 29, 2004.

TECHNICAL FIELD

The present invention relates to a method constituting an improvement of the method for reprocessing spent nuclear fuels known by the name PUREX method.

Specifically, the method according to the invention makes it possible to obtain separation of uranium from other actinides (plutonium, neptunium, thorium, . . . ) in a single purification cycle.

Like the PUREX method, it may be used for reprocessing spent nuclear fuels based on uranium oxide, mixed oxide of uranium and plutonium or mixed oxide of uranium and thorium.

PRIOR ART

All commercial plants for reprocessing spent nuclear fuels currently use the PUREX method (Plutonium Uranium Refining by EXtraction) in order to recover the uranium and plutonium present in these fuels.

This is achieved by using a plurality of cycles of purification by liquid-liquid extraction.

The first purification cycle is intended essentially to decontaminate the uranium and plutonium jointly with respect to fission products, as well as to divide these two elements into two separate flows.

This cycle as employed in modern plants for reprocessing spent nuclear fuels, such as the UP3 and UP2-800 plants of COGEMA in France, Thorp in the United Kingdom or Rokkasho in Japan, is represented in a schematic form in FIG. 1.

It starts with an operation consisting in co-extracting uranium and plutonium, the first in oxidation state (VI) and the second in oxidation state (IV), from the aqueous solution which contains them and which is obtained by dissolving a spent fuel in nitric acid (dissolution liquor). This co-extraction is carried out by means of a water-immiscible solvent which consists of an extractant, in the case in point tri-n-butyl phosphate (hereafter TBP), at 30% strength by volume in an organic diluent, namely hydrogenated tetrapropylene (hereafter TPH).

This is followed by one or more scrubbings of the solvent phase using one or more aqueous nitric solutions, which are intended to complete the decontamination of the uranium and plutonium with respect to fission products.

This set of co-extraction and scrubbing operations is symbolized by the "Extraction-washing" block in FIG. 1.

The aqueous phase resulting from these operations (extraction raffinate) contains the fission products (FP) and is eliminated from the cycle whereas the solvent phase, which is laden with uranium(VI) and plutonium(IV), is sent to a zone where these two elements are divided.

This partition comprises:

an operation which consists in back-extracting the majority of the plutonium present in the solvent phase and which is symbolized by the "Plutonium back-extraction" block in FIG. 1; and an operation which consists in completing the plutonium back-extraction and which is symbolized by the "Plutonium barrage" block in FIG. 1.

These two operations are carried out by reducing the plutonium(IV) to oxidation state (III), which is not readily extractable by TBP, allowing it to enter an aqueous nitric solution while the uranium remains in the solvent phase.

The reduction of the plutonium is performed with the aid of uranous nitrate and an anti-nitrous agent (or "nitrous acid scavenger" in the literature) whose role is to stabilize both the uranous nitrate and the plutonium(III) by destroying the nitric acid. In the case in point, the anti-nitrous agent is hydrazinium nitrate (NH), also known as hydrazine.

The aqueous phase resulting from the partition is subjected to washing with fresh solvent, intended to extract from this phase the uranium fraction liable to have followed the plutonium during its back-extraction. This washing is symbolized by the "Uranium washing" block in FIG. 1.

For its part, the solvent phase resulting from the partition is sent to a zone where the uranium(VI) is back-extracted by using an aqueous nitric solution of low acidity. This back-extraction is symbolized by the "Uranium back-extraction" block in FIG. 1.

In the first purification cycle illustrated in FIG. 1, the neptunium present in the dissolution liquor is extracted principally in the form of neptunium(VI), at the same time as the uranium and plutonium. During the reducing back-extraction of the plutonium, the neptunium(VI) is reduced by uranous nitrate to neptunium(IV), in which state it is extractable by TBP, albeit less than in oxidation state (VI).

Specifically, as reported by Germain et al. in *J. Inorg. Chem.*, 1970, vol. 32, 245-253 and as illustrated in FIG. 2, which represents the variations in the distribution coefficient of neptunium(IV) between an aqueous nitric phase and a solvent phase composed of TBP at 30% strength by volume in TPH, as a function of the uranium(VI) content in the solvent phase and for molar concentrations of nitric acid ranging from 0.5 M to 3.5 M, the distribution coefficient of neptunium (IV) increases with the acidity of the aqueous phase and decreases with the uranium(VI) content of the solvent phase.

Thus, in view of the high ratio of the flow rates S/A (standing for solvent/aqueous) and the low uranium(VI) content of the solvent phase, which prevail in the extractors where the uranium/plutonium partition takes place, in these extractors the neptunium(IV) remains in the solvent phase with the uranium. Likewise, the combination of S/A flow rate ratio x acidity in the "Uranium washing" is generally such that it reinforces the tendency of neptunium(IV) to remain in the solvent phase with the uranium. During the uranium back-extraction, the distribution coefficients of neptunium(IV) are lower than those of uranium(VI), so that the neptunium is back-extracted as efficiently as the uranium.

The neptunium thus follows the uranium substantially quantitatively during the first purification cycle of the PUREX method.

In the aforementioned plants for reprocessing spent nuclear fuels, after a concentrating operation (symbolized by the "Uranium concentration" block in FIG. 1), the aqueous effluent resulting from the uranium back-extraction is thus subjected to a cycle of purifying the uranium referred to as the "second uranium cycle", in order to separate the latter from the neptunium.

In the scope of producing new plants for reprocessing spent nuclear fuels, it would be desirable to be able to simplify the PUREX method so as to lessen both the investment, running and maintenance costs of these plants, without thereby reducing the performance of this method in terms of reprocessing yield, quality and reliability.

Now, experience shows that the decontamination of uranium with respect to fission products, including ruthenium, is already sufficient after the first purification cycle when the spent fuel has cooled for at least ten years before its reprocessing. In this case, therefore, the "second uranium cycle" is justified only by the need to separate uranium from neptunium.

The Inventors therefore set themselves the object of improving the PUREX method as it is employed in modern plants for reprocessing spent nuclear fuels, so that it makes it possible to separate the uranium not only from the plutonium but also from the neptunium in a single purification cycle, and so that it thus obviates the need for the "second uranium cycle" when the nuclear fuels to be reprocessed have cooled for ten years or more.

The inventors have furthermore set themselves the object that the separation of uranium from neptunium should be obtained without resorting to the use of powerful sequestrants of neptunium, which would certainly allow it to be entrained in an aqueous flow different from that of the uranium but which, per se or via their breakdown products, would be liable to constitute undesirable products in the aqueous effluents, entailing the need to subject these effluents to specific additional processing operations.

SUMMARY OF THE INVENTION

This object and others are achieved by a method for reprocessing a spent nuclear fuel, which successively comprises:

a) separating the uranium, plutonium and other actinides from the fission products present in an aqueous nitric solution obtained by dissolving the fuel in nitric acid, this separation comprising co-extraction of uranium(VI), plutonium(IV) and other actinides(IV) or (VI) from said aqueous solution by using a water-immiscible solvent phase comprising at least one extractant in an organic diluent, then washing the solvent phase with an aqueous nitric phase;

b) dividing the uranium and plutonium into two separate flows, this partition comprising back-extraction of the plutonium(III) from the solvent phase by using an aqueous nitric solution which contains a reducing agent capable of reducing plutonium(IV) to oxidation state (III);

c) back-extracting the uranium(VI) from the solvent phase by using an aqueous nitric solution;

d) concentrating the aqueous nitric solution resulting from step c) with respect to uranium(VI); and which is characterized in that some of the uranium(VI)-concentrated aqueous solution obtained in step d) is used for back-extracting from the solvent phase the actinide or actinides present in oxidation state (IV) in this phase, either during step b) or between steps b) and c).

The method according to the invention thus differs from the first purification cycle of the PUREX method, as it is employed in modern plants for reprocessing spent nuclear fuels, essentially in that it uses some of the uranium(VI)-concentrated aqueous flow, resulting from the concentrating operations lying downstream of the uranium back-extraction, in order to enrich the solvent phase with uranium(VI) upstream of this back-extraction so that it approaches saturation, and thus to lower the distribution coefficients of the actinides present in oxidation state (IV) in this solvent phase sufficiently to promote their entry into the aqueous phase.

It thereby makes it possible to back-extract the actinides (IV) from the solvent phase, and thereby to separate them from the uranium(VI) before it is back-extracted in its turn.

The actinides(IV) liable to be back-extracted by the method according to the invention are principally neptunium which is reduced from oxidation state (VI) to oxidation state (IV) during the uranium/plutonium partition, thorium which is extracted in oxidation state (IV) from the aqueous nitric solution obtained by dissolving the fuel, and/or plutonium which may remain in very small quantities in oxidation state (IV) during the partition.

As indicated above, the back-extraction of the actinide(IV) or actinides(IV) from the aqueous phase may firstly be carried out during step b) of the method according to the invention, that is to say during the uranium/plutonium partition, in which case this actinide or these actinides are back-extracted at the same time as the plutonium(III) and thus join the plutonium flow.

In this case, the uranium/plutonium partition comprising two substeps carried out in separate reactors, namely:

i) a first substep referred to as "Plutonium back-extraction", consisting in back-extracting the majority of the plutonium(III) from the solvent phase, and ii) a second substep referred to as "Plutonium barrage", consisting in completing the back-extraction of plutonium (III) from the solvent phase, said uranium(VI)-concentrated aqueous solution part is preferably used for back-extracting the actinide(IV) or actinides(IV) during the "Plutonium barrage" substep.

In order to do this, it is introduced into the extractor in which the "Plutonium barrage" substep takes place and in which it is supplemented with nitric acid, the reducing agent capable of reducing plutonium(IV) to plutonium(III) and the anti-nitrous agent.

In what has preceded and in what follows, the term "extractor" is intended to mean any liquid-liquid extraction apparatus which may be used in plants for reprocessing spent nuclear fuels, for example a mixer-settler or a battery of mixer-settlers, a pulse column or a mono- or multistage centrifugal extractor.

The back-extraction of the actinide(IV) or actinides(IV) from the solvent phase may secondly be carried out between steps b) and c) of the method according to the invention, that is to say between the uranium/plutonium partition and the uranium back-extraction, in which case this actinide or these actinides are back-extracted independently of the plutonium and form a third flow separated both from the plutonium flow and from the uranium flow.

In this case, the uranium(VI)-concentrated aqueous solution part is used for back-extracting the actinides(IV) in an extractor specifically allocated to this back-extraction.

Here again, the uranium/plutonium partition comprising two substeps carried out in separate reactors, namely:

i) a first substep referred to as "Plutonium back-extraction", consisting in back-extracting the majority of the plutonium(III) from the solvent phase, and ii) a second substep referred to as "Plutonium barrage", consisting in completing the back-extraction of plutonium (III) from the solvent phase, said uranium(VI)-concentrated aqueous solution part is introduced into an extractor which is supplied with solvent phase by the extractor in which the "Plutonium barrage" substep takes place, and in which it is supplemented with nitric acid.

Irrespective of the extractor in which the back-extraction of the actinide(IV) or actinides(IV) is carried out, it is obtained by mixing the solvent phase present in this extractor and the uranium(VI)-concentrated solution part which is introduced therein, under conditions which allow the solvent phase to be enriched with uranium(VI) until it approaches saturation, and which consequently allow the actinide(IV) or actinides(IV) to enter the aqueous phase, then by separating this mixture into a solvent phase and an aqueous phase containing the back-extracted actinide(IV) or actinides(IV).

The method according to the invention preferably furthermore comprises a step consisting in subjecting the aqueous phase containing the back-extracted actinide(IV) or actinides (IV) (and optionally the back-extracted plutonium(III) if these actinides are back-extracted during the uranium/plutonium partition) to one or more washes with a water-immiscible solvent phase comprising at least an extractant of uranium(VI) in an organic diluent, with a view to recovering the uranium(VI) which has followed these actinides during their back-extraction.

To this end, it is preferable to use a solvent phase whose extractant and organic diluent are identical to those of the solvent phase used in step a) of the method according to the invention.

In this regard, the solvent phase used during step a) preferably comprises TBP as an extractant and TPH as an organic diluent, and preferably in a volume ratio of 30/70.

The reducing agent capable of reducing plutonium(IV) to oxidation state (III) is preferably uranous nitrate, while the anti-nitrous agent is in turn advantageously hydrazinium nitrate.

It is however possible to use another extractant, for example triisobutyl phosphate (TiBP) or a monoamide and/or another organic diluent, for example n-dodecane or kerosene, just as it is possible to use another reducing agent, for example hydroxylammonium nitrate and/or another anti-nitrous agent, for example an anti-nitrous agent soluble in the solvent phase.

According to the invention, the uranium(VI)-concentrated aqueous solution part is furthermore supplemented with one or more agents complexing actinides(IV), although these agents neither need to be powerful nor need to be present at high levels, and their destruction may readily be integrated into the optimization parameters of the method according to the invention.

As examples of such agents, formic acid and tartaric acid may be mentioned.

Preferably, the actinide(IV) principally intended to be back-extracted during step b) or between steps b) and c) is neptunium.

The method according to the invention has numerous advantages.

In particular, it makes it possible very efficiently to separate uranium from the other actinides present in spent nuclear fuels in a single cycle of purification by liquid-liquid extraction and, when these fuels have been cooled for 10 years or more, to omit the "second uranium cycle" existing in the PUREX method, and to do so without fundamentally modifying the first purification cycle of this method as it is employed in modern plants for reprocessing spent nuclear fuels. It should also be noted that in the case when the back-extraction of the actinides(IV) is carried out during the partition, the method according to the invention can be employed in certain existing plants at the cost of relatively minor modifications.

Moreover, the method according to the invention offers the possibility of back-extracting the actinides(IV), and in particular neptunium(IV), by joining them with the plutonium flow, thus making it more difficult to use the plutonium for non-peaceful ends.

Other advantages and characteristics of the method according to the invention will become apparent on reading the rest of the description which follows, which refers to two exemplary embodiments of the method according to the invention.

These examples are of course given only as illustrations of the subject-matter of the invention and in no way constitute a limitation of this subject-matter.

BRIEF DESCRIPTION OF THE DRAWINGS

In FIGS. 1, 3 and 4, the solvent flows are symbolized by a double arrow, whereas the aqueous flows are symbolized by a single arrow. Moreover, the operations of washing the aqueous phases with TPH have intentionally not been represented for the sake of simplifying the diagrams.

DETAILED DESCRIPTION OF PARTICULAR EMBODIMENTS

Figure 3:
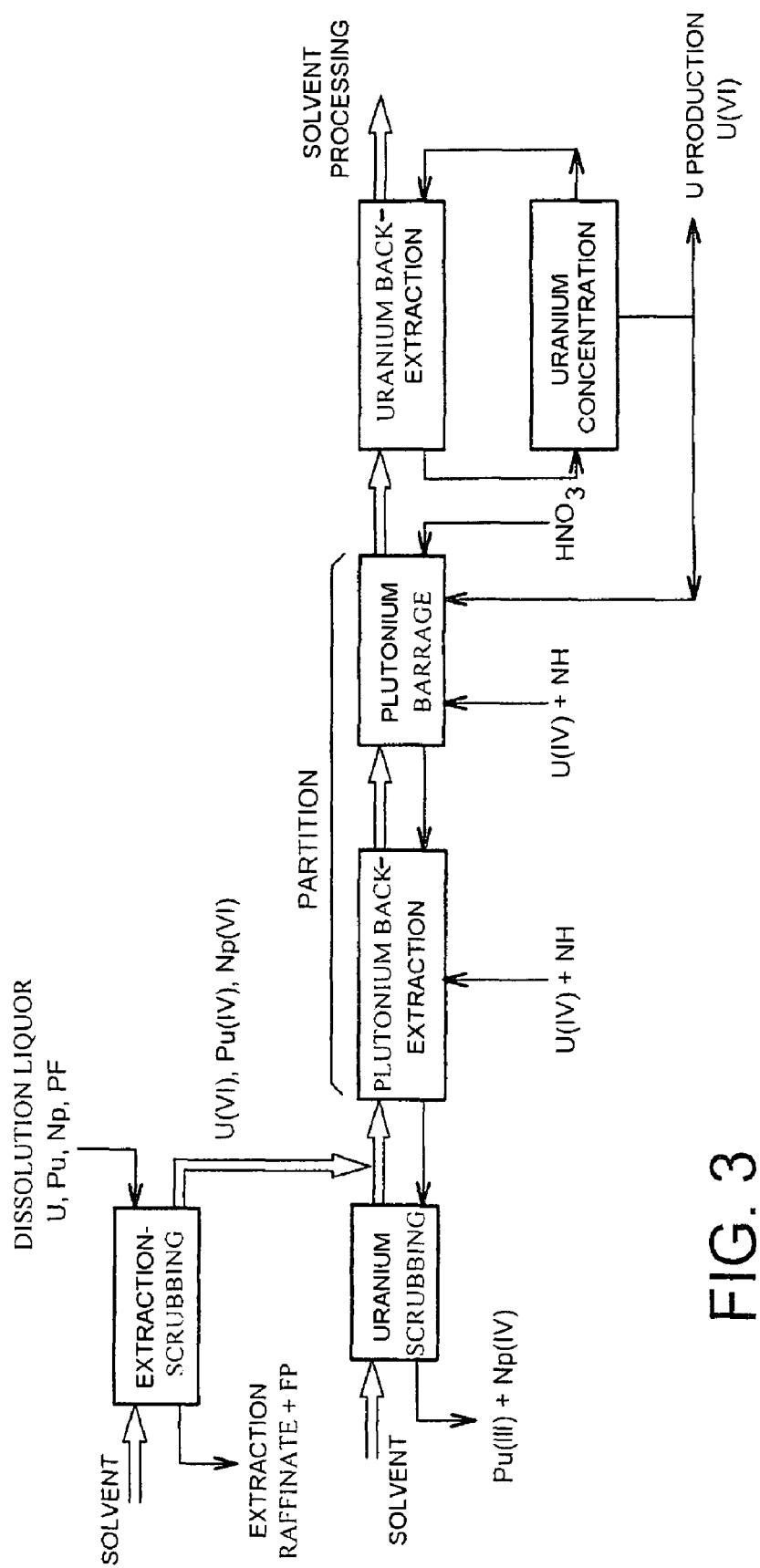
FIG. 3 represents a block diagram of a first exemplary embodiment of the method according to the invention.

Reference is first made to FIG. 3, which represents a block diagram of a first exemplary embodiment of the method according to the invention, designed to permit back-extraction of neptunium(IV) during the uranium/plutonium partition.

Figure 1:
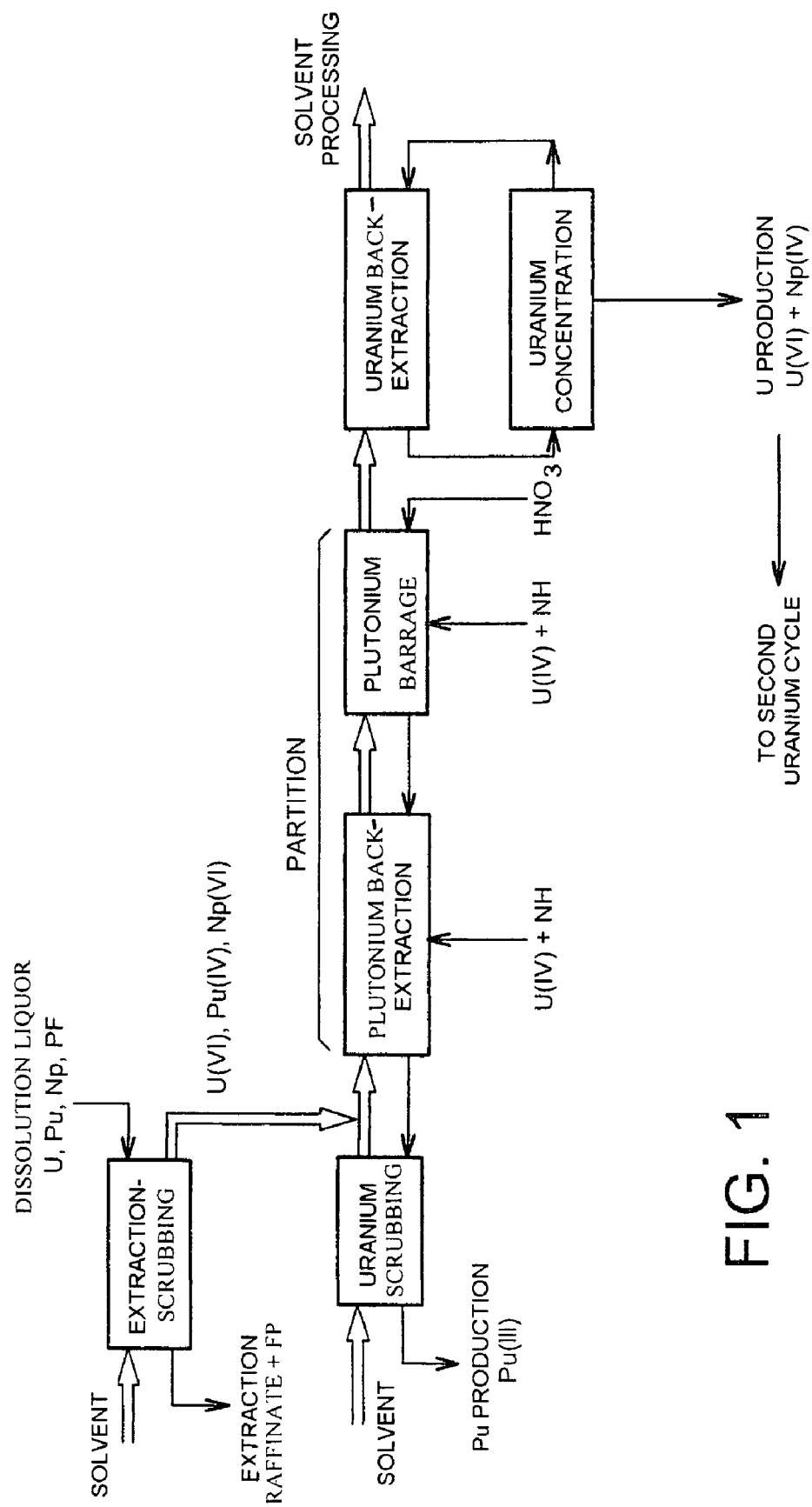
FIG. 1 represents a block diagram of the first purification cycle of the PUREX method as it is employed in modern plants for reprocessing spent nuclear fuels.
Figure 2:
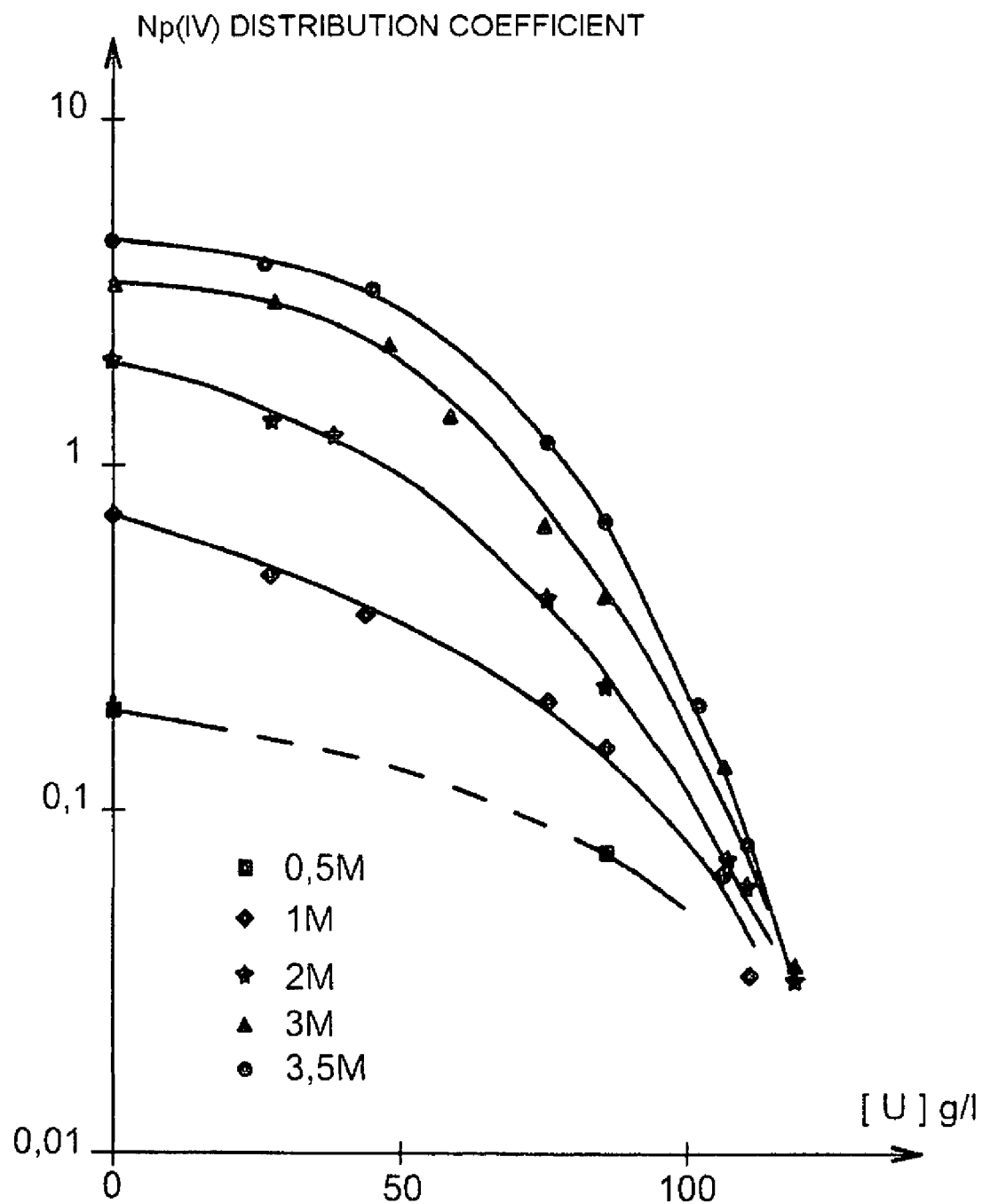
FIG. 2 represents the variations in the distribution coefficient of neptunium(IV) between an aqueous nitric phase and a solvent phase, composed of TBP at 30% strength by volume in TPH, as a function of the uranium content ([U] in g/L) of the solvent phase and for different molar concentrations of nitric acid (■-■: 0.5 M; ♦-♦: 1 M; *-*: 2 M; ▲-▲: 3 M; ●-●: 3.5 M) in the aqueous phase.

In this example, like the first purification cycle of the PUREX method as illustrated in FIG. 1, the method according to the invention comprises the following operations:

co-extraction of uranium, plutonium and neptunium, respectively in oxidation states (VI), (IV) and (VI), from a dissolution liquor by using a solvent consisting of TBP at 30% strength (v/v) in TPH, followed by washing the solvent phase resulting from this co-extraction with an aqueous nitric solution in order to complete the decontamination of uranium, plutonium and neptunium with respect to fission products ("Extraction-scrubbing");

uranium/plutonium partition, this partition comprising:
back-extraction of plutonium in oxidation state (III) from the solvent phase laden with uranium, plutonium and neptunium by using an aqueous nitric solution containing uranous (U(IV)) nitrate and hydrazinium nitrate as an anti-nitrous agent ("Plutonium back-extraction");
washing the solvent phase resulting from the plutonium back-extraction with an aqueous nitric solution also containing uranous nitrate and hydrazinium nitrate ("Plutonium barrage");
washing the aqueous phase laden with plutonium(III) and coming from the uranium/plutonium partition by using fresh solvent consisting of TBP at 30% strength (v/v) in TPH ("Uranium scrubbing");

back-extraction of uranium(VI) from the solvent phase coming from the uranium/plutonium partition by using an aqueous nitric solution ("Uranium back-extraction"); and concentrating the aqueous phase laden with uranium(VI) and coming from the uranium back-extraction ("Uranium concentration").

As in the first purification cycle of the PUREX method illustrated in FIG. 1, the neptunium initially extracted in oxidation state (VI) is reduced to oxidation state (IV) by uranous nitrate during the uranium/plutonium partition.

However, unlike the first purification cycle of the PUREX method as illustrated in FIG. 1, in which all of the uranium (VI)-concentrated aqueous solution is sent to a second uranium purification cycle intended to separate the uranium(VI) from the neptunium(IV), which are present in this solution, in the exemplary embodiment of the method according to the invention as illustrated in FIG. 3 some of the uranium(VI)-concentrated aqueous solution is refluxed to the extractor in which the "Plutonium barrage" takes place.

The aqueous nitric solution used for the "Plutonium barrage" therefore consists of this uranium(VI)-concentrated reflux, which is supplemented with nitric acid, preferably of molarity at most equal to 2, or even better at most equal to 1, as well as uranous nitrate, hydrazinium nitrate, and optionally a sequestrant of neptunium(IV) such as formic acid.

The effect of the intimate mixing of the aqueous nitric solution thus obtained with the said solvent phase is to enrich the latter with uranium(VI) so that it approaches saturation, and this enrichment combined with the low acidity prevailing in the extractor causes the neptunium(IV) to enter the aqueous phase.

As in the first purification cycle of the PUREX method illustrated in FIG. 3, the effluent aqueous phase of the "Plutonium barrage", which in the case in point contains both neptunium(IV) and plutonium(III), is sent to the extractor where the "Plutonium back-extraction" takes place and in which it becomes laden with plutonium(III), then it is sent to the extractor where the "Uranium scrubbing" takes place and in which it is scrubbed with fresh solvent in order to recover the uranium(VI) liable to have followed the neptunium(IV) and plutonium(III) during their back-extraction.

The effluent solvent phase of the "Plutonium barrage" is for its part sent to the extractor in which the "Uranium back-extraction" takes place and in which the uranium(VI) is back-extracted, as it conventionally is in the first purification cycle of the PUREX method illustrated in FIG. 1.

Figure 4:
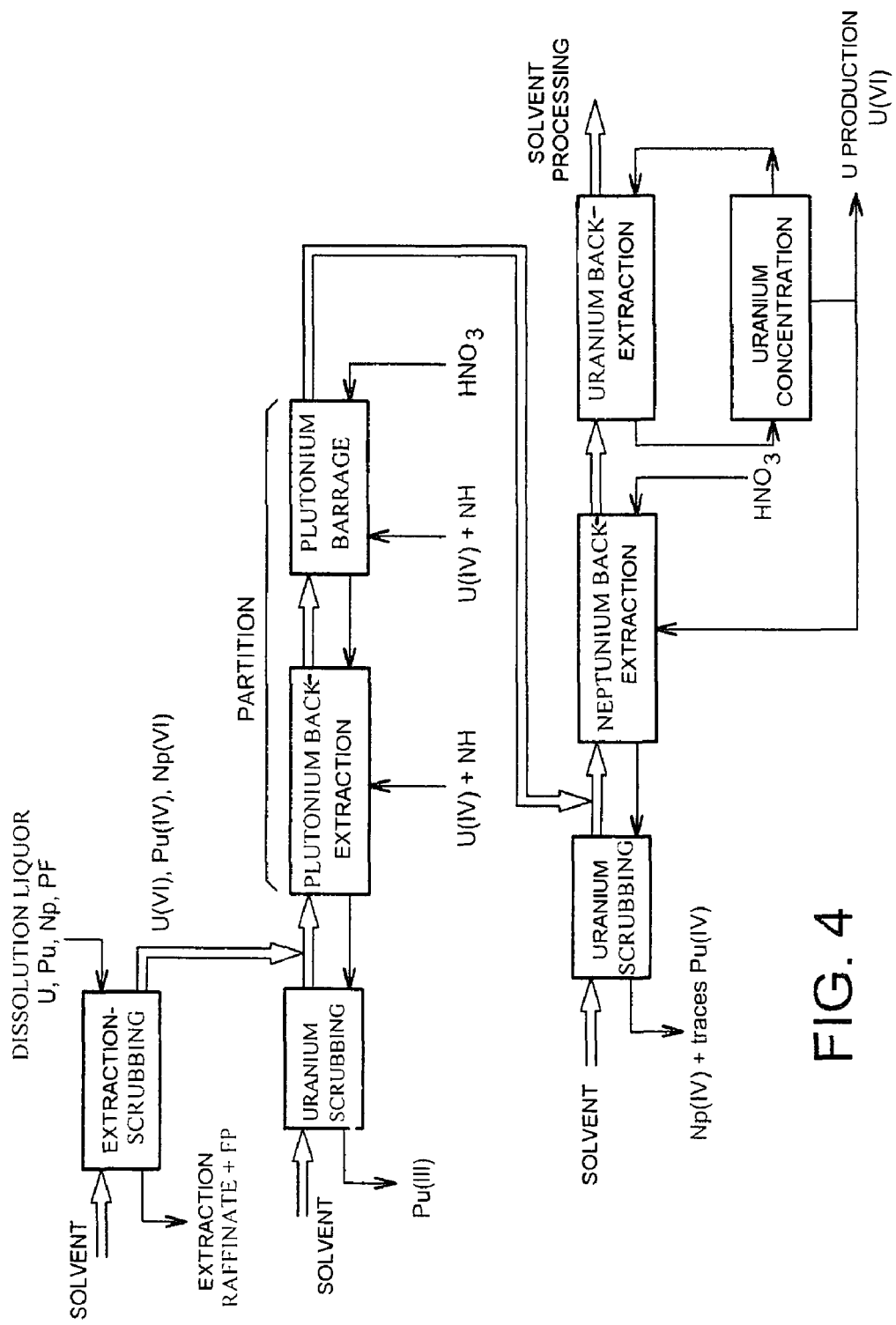
FIG. 4 represents a block diagram of a second exemplary embodiment of the method according to the invention.

Reference is now made to FIG. 4 which represents a block diagram of a second exemplary embodiment of the method according to the invention, which in its turn is designed to permit back-extraction of neptunium(IV) and possible traces of plutonium(IV) remaining in the solvent phase, between the uranium/plutonium partition and the uranium back-extraction.

In this example, which also contains the "Extraction-scrubbing", "Plutonium back-extraction", "Plutonium barrage", "Uranium scrubbing", "Uranium back-extraction" and "Uranium concentration" operations belonging to the PUREX method as illustrated in FIG. 1, some of the uranium(VI)-concentrated aqueous solution is refluxed into an extractor which is specially allocated to the neptunium(IV) back-extraction—which is symbolized by the "Neptunium back-extraction" block in FIG. 4—and which is placed between the extractor in which the "Plutonium barrage" takes place and that of the "Uranium back-extraction".

The extractor allocated to the "Neptunium back-extraction" is therefore supplied with solvent phase by the extractor of the "Plutonium barrage", which contains uranium(VI), neptunium(IV) and possible traces of plutonium(IV), and with aqueous phase by the uranium(VI)-concentrated reflux, which is supplemented with nitric acid, preferably of molarity at most equal to 2, or even better at most equal to 1, and optionally a sequestrant of neptunium(IV) such as formic acid.

As before, the effect of the intimate mixing of the aqueous nitric solution thus obtained with the said solvent phase is to enrich the latter with uranium(VI) so that it approaches saturation, and this enrichment combined with the low acidity prevailing in the extractor causes the neptunium(IV) and possible traces of plutonium(IV) to enter the aqueous phase.

The effluent aqueous phase of the "Neptunium back-extraction", which in the case in point contains neptunium(IV) and where applicable plutonium(IV), is sent to an extractor in which it is scrubbed with fresh solvent, also consisting of TBP at 30% strength (v/v) in TPH, in order to recover the uranium (VI) liable to have followed the neptunium(IV) during its back-extraction—this scrubbing being symbolized by a second "Uranium scrubbing" block in FIG. 4—whereas the effluent solvent phase of the "Neptunium back-extraction" is sent to the extractor of the "Uranium back-extraction" where the uranium(VI) is back-extracted, as it conventionally is in the first purification cycle of the PUREX method illustrated in FIG. 1.

Irrespective of the embodiment of the method according to the invention, the Inventors consider that it is desirable and possible to adjust the various operating parameters of the extractor in which the neptunium(IV) is back-extracted, and in particular the feed flow rates of solvent phase and uranium (VI)-concentrated aqueous solution, so as to bring the uranium(VI) content of the solvent phase in this extractor to a value preferably of the order of from 90 to 105 g/L, saturation with uranium(VI) being reached at 114 g/L.

These parameters can be readily determined and optimized by means of the PAREX software (developed by the COMMISSARIAT A L'ENERGIE ATOMIQUE) which comprises the distribution coefficients both of uranium(VI) and of neptunium(IV).

By way of example, a simulation was carried out with the aid of this software for the second exemplary embodiment of the method according to the invention, as illustrated in FIG. 4. In this simulation, no use of any specific sequestrant for oxidation degrees (IV) was envisaged.

The input data of this simulation were as follows:

Solvent phase flow leaving the "Plutonium barrage":
 Flow rate: 1746 L/hour
 U(VI): 75.5 g/L
 $HNO_3$: 0.017 mol/L
 Np(IV): 38 mg/L Aqueous phase flow (denoted "$HNO_3$" in FIG. 4) entering the "Neptunium back-extraction" extractor:
 Flow rate: 70 L/hour
 U(VI): 0 g/L
 $HNO_3$: 0.1 mol/L
 Np(IV): 0 mg/L Aqueous phase flow entering the "Neptunium back-extraction" extractor and coming from the "Uranium concentration":
 Flow rate: 200 L/hour
 U(VI): 400 g/L
 $HNO_3$: 0.5 mol/L
 Np(IV): <1 mg/L Solvent phase flow (denoted "Solvent" in FIG. 4) entering the "Uranium scrubbing" extractor adjacent to the "Neptunium back-extraction" extractor:

Flow rate: 254 L/hour
TBP at 30% strength
$HNO_3$: 0 mol/L

For these data, and by choosing a partition battery with 2 stages (in the direction of the flow of the solvent phase), the following compositions of solvent phase and aqueous phase were obtained:

Solvent phase leaving the "Neptunium back-extraction" extractor:

Flow rate: 2026 L/hour
U(VI): 105 g/L
$HNO_3$: $3.5 \cdot 10^{-3}$ mol/L
Np(IV): 0.18 mg/L Aqueous phase leaving the "Uranium scrubbing" extractor adjacent to the "Neptunium back-extraction" extractor:

Flow rate: 247 L/hour
U(VI): 5 mg/L
$HNO_3$: 0.5 mol/L
Np(IV): 267 mg/L

The decontamination factor of uranium with respect to neptunium is therefore 180, and the desired decontamination object is achieved.

The invention claimed is:

1. A method for reprocessing a spent nuclear fuel, which successively comprises:
   a) separating uranium, plutonium and other actinides from fission products present in an aqueous nitric solution obtained by dissolving the fuel in nitric acid, said separation comprising co-extracting uranium(VI), plutonium(IV) and other actinides(IV) or (VI) from said aqueous solution by using a water-immiscible solvent phase comprising at least one extractant in an organic diluent, and then scrubbing the solvent phase with an aqueous nitric solution;
   b) back-extracting plutonium in the oxidation state (III) from the solvent phase resulting from step a) by using an aqueous nitric solution which contains a reducing agent capable of reducing plutonium(IV) into plutonium(III);
   c) back-extracting uranium(VI) from the solvent phase resulting from step b) by using an aqueous nitric solution;
   d) concentrating the aqueous nitric solution resulting from step c) with respect to uranium(VI);
and in which a part of the uranium(VI)-concentrated aqueous solution resulting from step d) is used for further back-extracting during step b) at least one actinide(IV) selected from neptunium(IV) and thorium(IV) from the solvent phase resulting from step a).

2. The method of claim 1, in which step b) comprises:
   i) back-extracting the majority of the plutonium(III) from the solvent phase in a first extractor, and
   ii) completing the back-extraction of plutonium(III) from the solvent phase in a second extractor,
wherein the uranium(VI)-concentrated aqueous solution part is used for back-extracting the actinide(IV) during step ii).

3. The method of claim 2, in which the uranium(VI)-concentrated aqueous solution part is introduced into the second extractor and is supplemented with nitric acid, the reducing agent capable of reducing plutonium(IV) into plutonium(III) and an anti-nitrous agent.

4. The method of claim 1, in which the back-extraction of the actinide(IV) from the solvent phase is obtained by mixing said solvent phase and said uranium(VI)-concentrated solution part, and then by separating this mixture into a solvent phase and an aqueous phase containing the back-extracted actinide(IV).

5. The method of claim 4, further comprising the step of subjecting the aqueous phase containing the back-extracted actinide(IV) to one or more scrubbings with a water-immiscible solvent phase comprising an extractant of uranium(VI) in an organic diluent.

6. The method of claim 5, in which the extractant and the organic diluent of said solvent phase are identical to those of the solvent phase used in step a).

7. The method of claim 1, in which the solvent phase used during step a) comprises tri-n-butyl phosphate as an extractant.

8. The method of claim 1, in which the solvent phase used during step a) comprises hydrogenated tetrapropylene as an organic diluent.

9. The method of claim 1, in which the reducing agent capable of reducing plutonium(IV) into plutonium(III) is uranous nitrate.

10. The method of claim 3, in which the uranium(VI)-concentrated aqueous solution part is furthermore supplemented with one or more agents complexing actinides(IV).

11. The method of claim 1, in which the actinide(IV) to be back-extracted during step b) is neptunium.

12. The method of claim 1, in which the spent nuclear fuel is an uranium oxide nuclear fuel, an uranium-plutonium mixed oxide nuclear fuel or an uranium-thorium mixed oxide nuclear fuel.

13. A method for reprocessing a spent nuclear fuel, which successively comprises:
   a) separating uranium, plutonium and other actinides from fission products present in an aqueous nitric solution obtained by dissolving the fuel in nitric acid, said separation comprising co-extracting uranium(VI), plutonium(IV) and other actinides(IV) or (VI) from said aqueous solution by using a water-immiscible solvent phase comprising at least one extractant in an organic diluent, and then scrubbing the solvent phase with an aqueous nitric solution;
   b) back-extracting plutonium in the oxidation state (III) from the solvent phase resulting from step a) by using an aqueous nitric solution which contains a reducing agent capable of reducing plutonium(IV) into plutonium(III);
   c) back-extracting uranium(VI) from the solvent phase resulting from step b) by using an aqueous nitric solution;
   d) concentrating the aqueous nitric solution resulting from step c) with respect to uranium(VI);
and in which a part of the uranium(VI)-concentrated aqueous solution resulting from step d) is used for back-extracting between steps b) and c) at least one actinide (IV) selected from neptunium(IV), thorium(IV) and plutonium(IV) from the solvent phase resulting from step b).

14. The method of claim 13, in which the uranium(VI)-concentrated aqueous solution part is used for back-extracting the actinides(IV) in an extractor specifically allocated to this back-extraction.

15. The method of claim 14, in which step b) comprises:
   i) back-extracting the majority of the plutonium(III) from the solvent phase in a first extractor, and
   ii) completing the back-extraction of plutonium(III) from the solvent phase in a second extractor,
and in which the uranium(VI)-concentrated aqueous solution part is introduced into a third extractor which is supplied with solvent phase by the second extractor, and is supplemented with nitric acid.

16. The method of claim 13, in which the back-extraction of the actinide(IV) from the solvent phase is obtained by mixing said solvent phase and said uranium(VI)-concentrated solution part, and then by separating this mixture into a solvent phase and an aqueous phase containing the back-extracted actinide(IV).

17. The method of claim 16, which furthermore comprises a step of subjecting the aqueous phase containing the back-extracted actinide(IV) to one or more scrubbings with a water-immiscible solvent phase comprising an extractant of uranium(VI) in an organic diluent.

18. The method of claim 17, in which the extractant and the organic diluent of said solvent phase are identical to those of the solvent phase used in step a).

19. The method of claim 13, in which the solvent phase used during step a) comprises tri-n-butyl phosphate as an extractant.

20. The method of claim 13, in which the solvent phase used during step a) comprises hydrogenated tetrapropylene as an organic diluent.

21. The method of claim 13, in which the reducing agent capable of reducing plutonium(IV) into plutonium(III) is uranous nitrate.

22. The method of claim 15, in which the uranium(VI)-concentrated aqueous solution part is furthermore supplemented with one or more agents complexing actinides(IV).

23. The method of claim 13, in which the actinide(IV) to be back-extracted between steps b) and c) is neptunium(IV).

24. The method of claim 13, in which the spent nuclear fuel is an uranium oxide nuclear fuel, an uranium-plutonium mixed oxide nuclear fuel or an uranium-thorium mixed oxide nuclear fuel.

* * * * *